United States Patent [19]

Hoshii

[11] 4,293,927
[45] Oct. 6, 1981

[54] POWER CONSUMPTION CONTROL SYSTEM FOR ELECTRONIC DIGITAL DATA PROCESSING DEVICES

[75] Inventor: Toshifumi Hoshii, Fussa, Japan

[73] Assignee: Casio Computer Co., Ltd., Tokyo, Japan

[21] Appl. No.: 102,768

[22] Filed: Dec. 12, 1979

[51] Int. Cl.³ .................... G06F 11/30; H03K 5/13
[52] U.S. Cl. ............................ 364/900; 307/269; 365/227
[58] Field of Search ............ 235/455, 472; 250/205, 250/568; 340/146.3 F, 146.3 R, 365 R; 365/226–229; 307/203, 269; 364/200 MS File, 900 MS File, 736

[56] References Cited

U.S. PATENT DOCUMENTS

| | | | |
|---|---|---|---|
| 3,453,601 | 7/1969 | Bogert et al. | 364/200 |
| 3,736,569 | 5/1973 | Bouricius et al. | 365/227 |
| 3,925,639 | 12/1975 | Hester | 235/472 |
| 3,941,989 | 3/1976 | McLaughlin et al. | 307/203 |
| 3,944,979 | 3/1976 | Kwok | 250/205 |
| 4,072,859 | 2/1978 | McWaters | 250/568 |
| 4,101,072 | 7/1978 | Weaver et al. | 235/455 |
| 4,137,563 | 1/1979 | Tsunoda | 307/269 |
| 4,143,358 | 3/1979 | Neff | 340/146.3 SY |
| 4,144,580 | 3/1979 | Seki et al. | 340/365 R |
| 4,160,156 | 7/1979 | Sherer | 235/472 |

Primary Examiner—Leo H. Boudreau
Attorney, Agent, or Firm—Frishauf, Holtz, Goodman and Woodward

[57] ABSTRACT

A power consumption control system for electronic digital data processing devices is provided with a counter circuit to update a time count operation and to count a given time every time any one of the keys in the key input section is depressed. When none of the keys in the key input section is depressed before the counter circuit finishes the count of the given time, the oscillation operation of the oscillator circuit which supplies the clock pulse to the data processing device is stopped.

9 Claims, 39 Drawing Figures

FIG. 2(a)
FIG. 2(b) AUTOMATIC OFF
FIG. 2(c) KEY ON
FIG. 2(d) KEY OFF

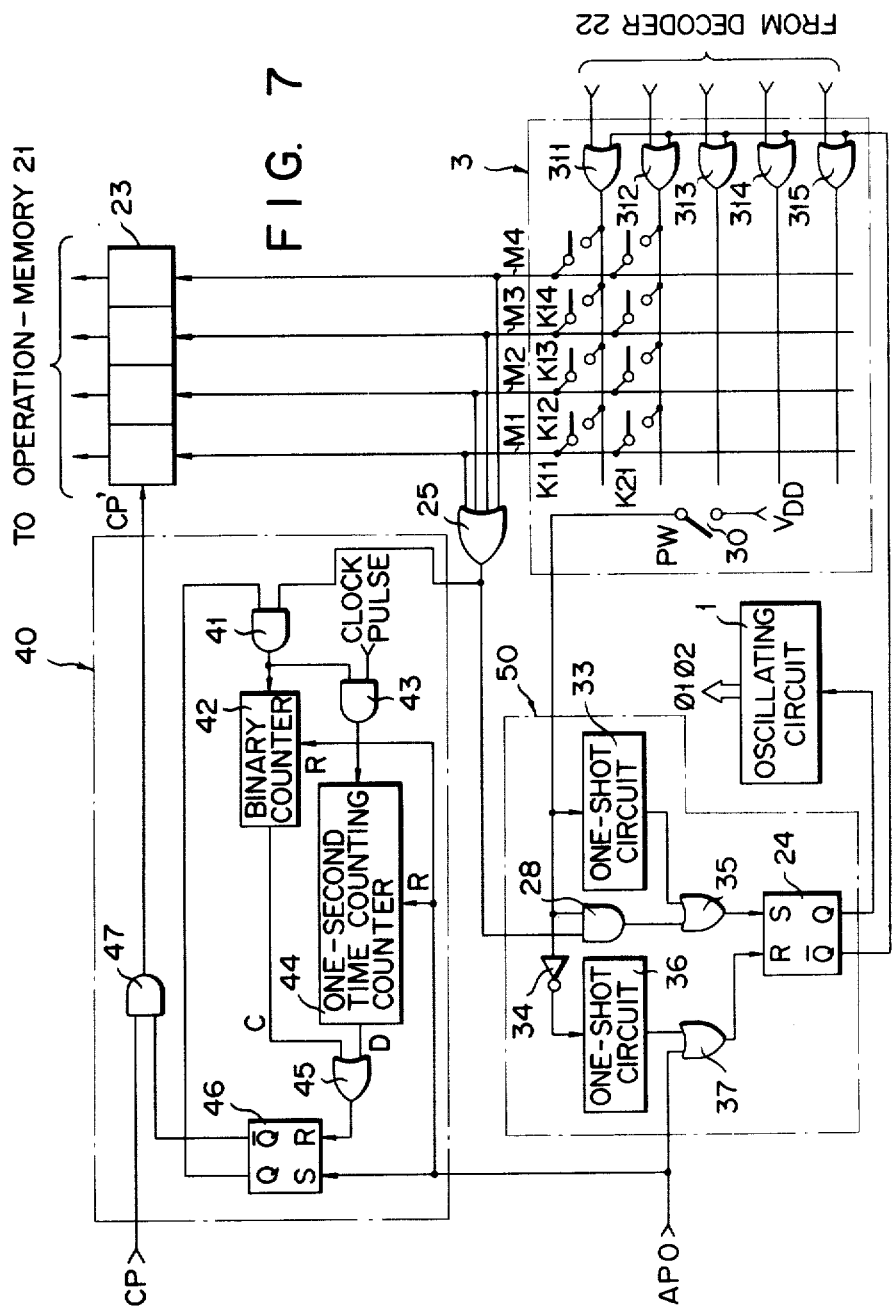

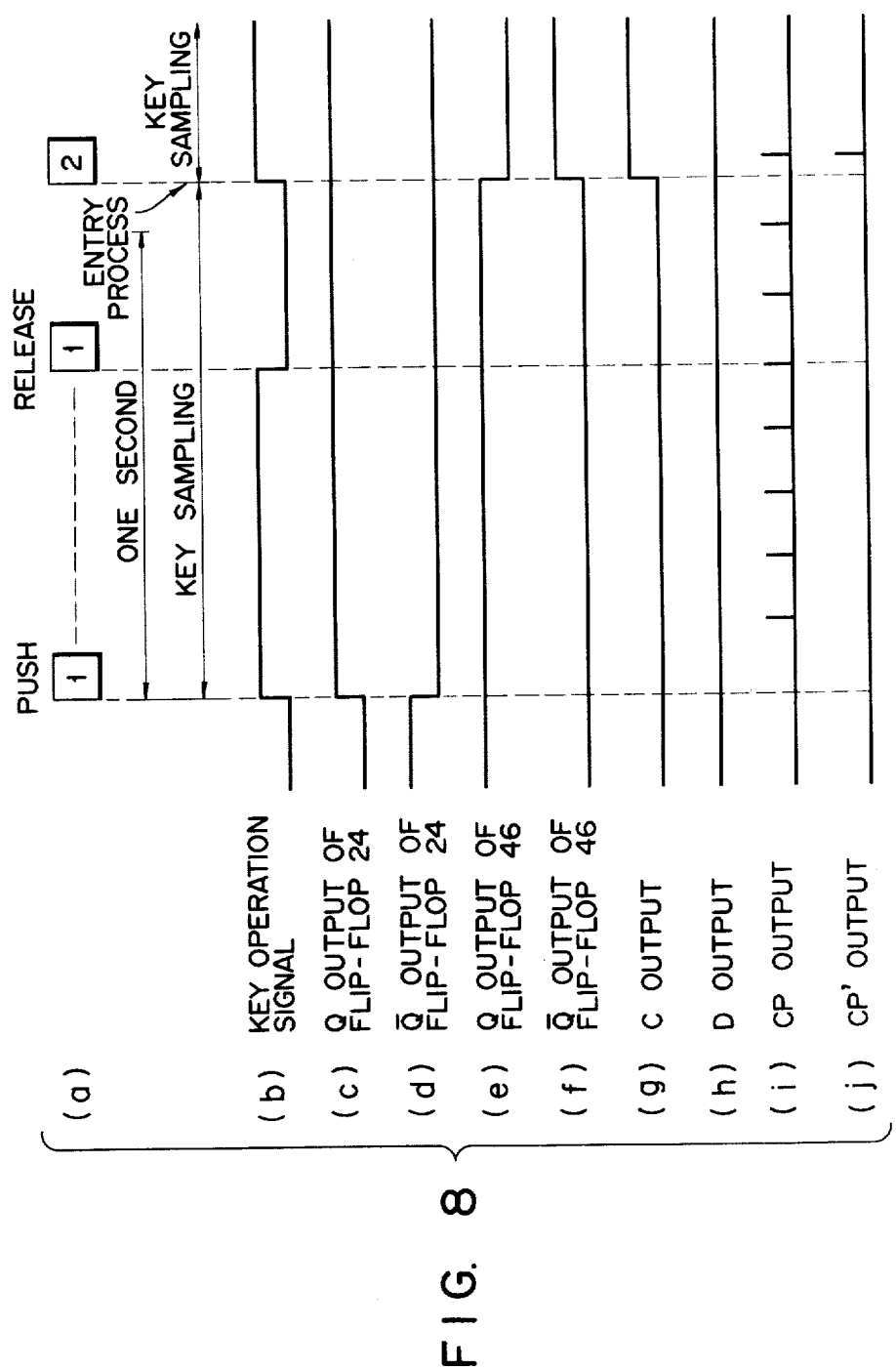

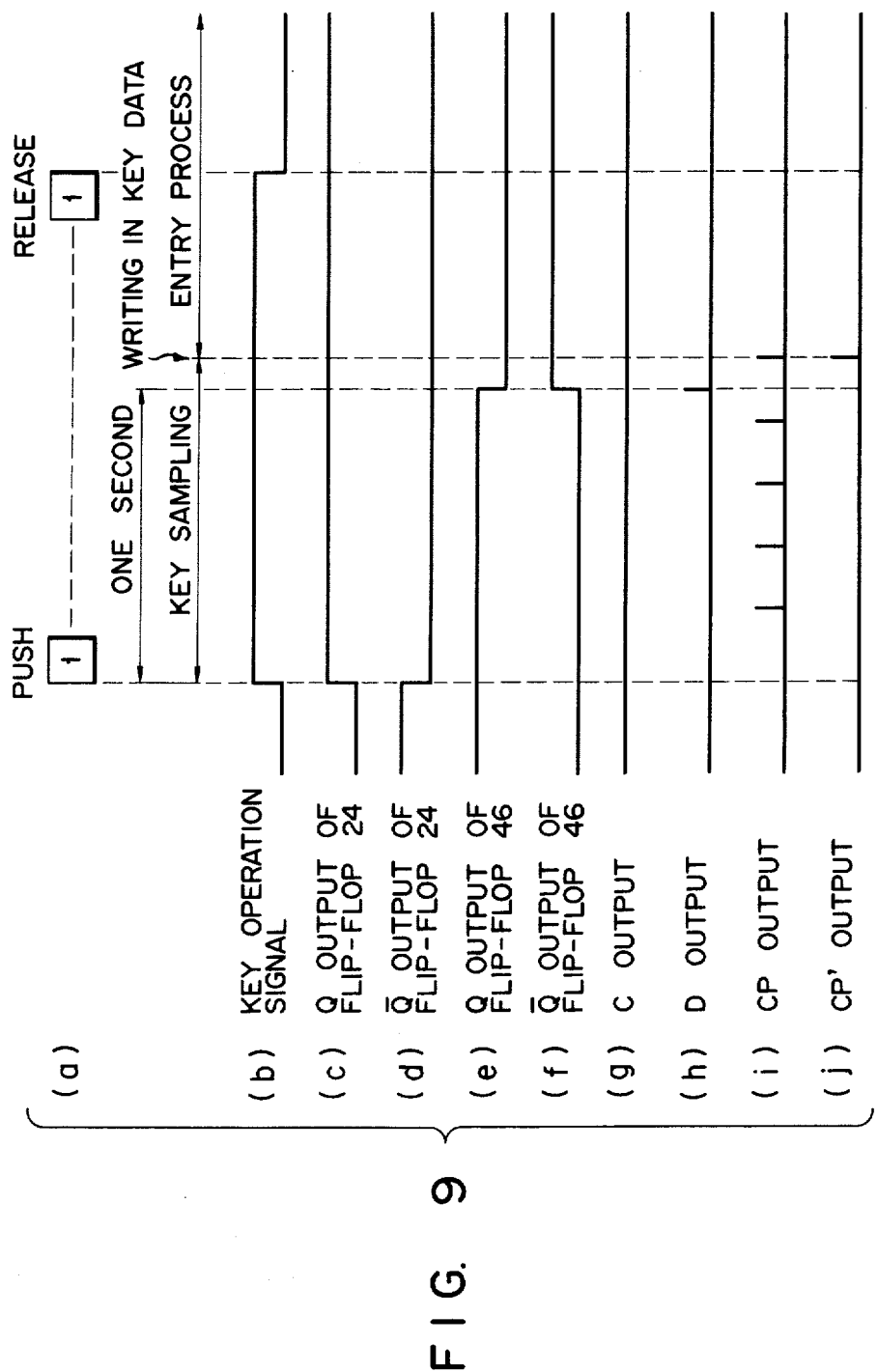

POWER CONSUMPTION CONTROL SYSTEM FOR ELECTRONIC DIGITAL DATA PROCESSING DEVICES

BACKGROUND OF THE INVENTION

The present invention relates to a power consumption control system for effectively saving power consumption in an electronic device which is controlled in synchronism with a clock pulse from an oscillator circuit and digitally processes data.

The electronic device of this type is miniaturized and mostly uses a battery as a power source. Therefore, the important problem in this type of device is how to reduce the power consumption of the electronic device. One of the proposals is to prevent the useless power consumption of the battery when an operator fails to turn off the power switch of the electronic device. More specifically, a so-called automatic turn off system is known in which, after a given time lapses from the final key operation, a power source to drive the respective circuits is automatically turned off. This method is effective to save wasteful power consumption. However, when the key operation is held an in interrupted state during the operation for some reason, the power source is shut off upon a lapse of a given time after any key has been depressed immediately before it is put into the interrupted state. As a result, the results of the operations are all cleared. In such a case, the operation must be newly performed again. This is very onerous for the operator.

The consumed power of CMOS (complementary type MOS) LSI chips, which has been employed in the electronic circuit of an electronic calculator in recent days, is generally expressed by $fCV^2$ where f is the frequency of the signal to the drive circuits, C is a stray capacitance and V is the operating voltage. It can be seen from the expression that the decrease of the effective frequency f reduces the power consumption of the calculator.

The conventional electronic calculator with an automatic power off function involves another technical problem in releasing the automatic power off state. To release the automatic power off state, the conventional calculator uses a special key provided for the purpose of that release. Another conventional device employs an ON key and an OFF key and the ON key is used for releasing the automatic power off mode. A further conventional calculator uses one (for example, a C (clear) key) of the various keys arranged in the key input section to release the automatic power off mode. The former cases need additional keys for its purpose. This leads to an increase of the number of keys and hinders the miniaturization of the device. The latter case does not need an additional key but an operator must search for the specified key for the release from a number of keys. Further, before the data entering or the data processing of an input, an operator must depress a key utterly unrelated to such operations. Therefore, the operability of the calculator is considerably deteriorated.

Accordingly, an object of the invention is to provide a power consumption control system for effectively saving power consumption in an electronic device which is controlled in syncrhonism with a clock pulse from an oscillator circuit and digitally processes data.

Another object of the invention is to provide a power consumption control system for effectively saving power consumption in electronic digital data processing devices, which can considerably reduce the power consumption without interrupting the power source. To achieve this object, after a given time lapses from the final key-in operation in a power on state, an oscillating circuit to produce a clock pulse for forming various timing signals necessary for the circuit operation is automatically stopped thereby to decrease the effective frequency f.

Another object of the invention is to provide a power consumption control system for effectively saving power consumption in the electronic device which can effectively release the automatic power off mode when the operation of a key is performed after the automatic power off mode is set up.

Another object of the invention is to provide a power consumption control system which can release the automatic power off mode by the operation by a proper key and at the same time can judge if the data processing for the depressed key is performed or not.

In the specification, the term "automatic power off" means that a power source system of the electronic device is automatically stopped and that the electronic device is placed in a low power consuming state substantially equivalent to a state that the power source is shut off.

In the power consumption control system according to the invention, a pulse generator which consumes a relatively large power in the electronic device is stopped, so that the drive of the electronic device is stopped as if the power source is shut off.

Accordingly, the term "automatic power off" in the specification of the present application is slightly different from the sensed usually used. Since it has the same meaning as the general "automatic power off", however, the same term is used.

SUMMARY OF THE INVENTION

To achieve the above object, there is provided a power consumption control system for electronic digital data processing devices comprising: an oscillating circuit for producing a basic clock signal, for driving respective portions of the electronic device; a key input section having a plurality of key switches; counting means for updating and initiating a count operation every time any one of the key switches is operated; and control means for causing the oscillating circuit to stop generating the basic clock signal when none of the key switches is operated until said count means completes counting for a given period of time.

With such a construction, when no keying in operation is performed for a given period of time while the power source is turned on, the oscillation of the oscillating circuit is stopped to stop generation of the clock signal and to thereby stop all the circuit operations. However, the operation results in the memory continue to be held or stored. Therefore, the wasteful power consumption when an operator fails to turn off the power source switch may be prevented. Additionally, the data obtained before the oscillation of the oscillating circuit stops is held and therefore the data is held even in the course of the operation execution. Accordingly, there is no need to reenter the identical data at the restart of the operation, thereby to allow the calculator to smoothly enter the execution of the operation. In this respect, the key in operation is remarkably improved.

BRIEF DESCRIPTION OF THE DRAWINGS

FIGS. 2(a) to 2(d) show a display state and a memory state in various operation modes of the calculator shown in FIG. 1;

FIG. 7 shows a block diagram of the major portion of the circuit shown in FIG. 6;

FIGS. 8(a) to 8(f) show a set of timing diagrams for explaining the operation of the circuit shown in FIG. 7; and FIGS. 9(a) to 9(f) show a set of timing diagrams for explaining another operation of the circuit shown in FIG. 7.

DETAILED DESCRIPTION

Figure 1:
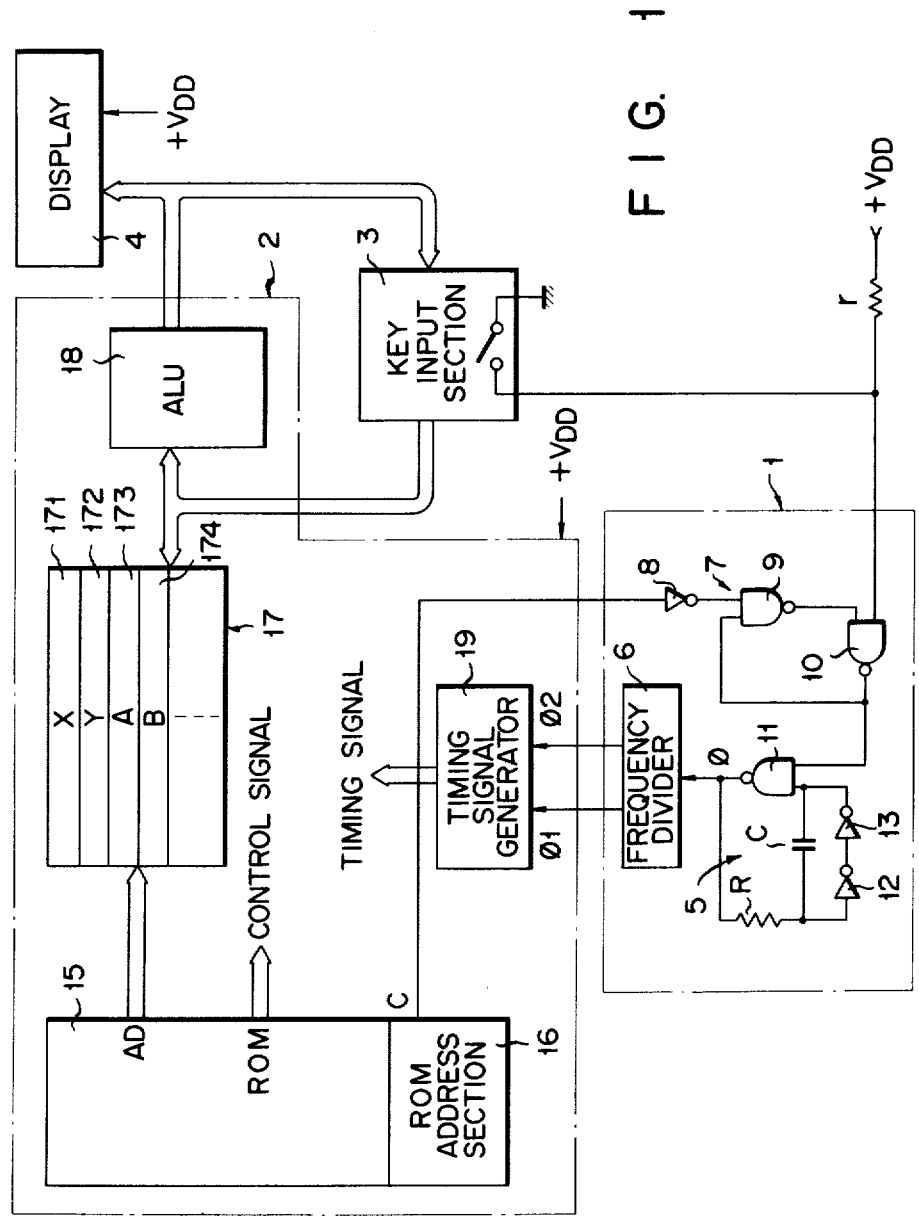
FIG. 1 shows a block diagram of an overall construction of an embodiment when the power consumption control system of the invention is applied to an electronic calculator.

FIG. 1 is a block diagram of an overall system of an embodiment of the invention as applied to an electronic calculator. The embodiment of FIG. 1 comprises an oscillator circuit 1, a central processing unit (CPU) 2, a key input section 3, and a display section 4. The oscillator circuit 1 is further comprised of an oscillator 5, a frequency divider 6, and an input gate 7. To a first terminal of a NAND gate 9 in the input gate 7 through a inverter 8 is inputted a control signal C outputted from an ROM address section 16 in the CPU 2. An output signal from a NAND gate 10 is inputted to a second terminal of the NAND gate 9. An output signal from the NAND gate 9 is applied to a first input terminal of the NAND gate 10. A second input terminal of the NAND gate 10 is directly coupled with an output terminal of the key input section 3 so that, when a key of the key input section 3 is operated, its key operation signal is inputted to the gate 10 and also is coupled through a resistor r with an input terminal of a power source (not shown) of a voltage $+V_{DD}$. Accordingly, when a key of the key input section 3 is operated, a signal of a binary logical level "0" is applied to the NAND gate 10. When it is not operated, a signal of logical "1" is applied to the same. The control signal C is outputted as a signal of logical level "1" when none of the keys are operated during a given period, e.g. 10 minutes or more. At this time, the input gate circuit 7 stops the oscillation of the oscillator 5. The oscillator 5 has a NAND gate 11, a resistor R of resistance R and a capacitor C of capacitance C which are connected between the first input terminal and an output terminal of the NAND gate 11, and inverters 12 and 13 for suppressing a wave distortion of a signal therethrough connected in series across the capacitor C. Further, the output from the NAND gate 10 is applied to a second input terminal of the NAND gate 11 of which the output signal ($\phi$) is applied to the frequency divider 6. The oscillator 5 with such a construction operates when a signal with a logical level "1" is applied to the second input terminal of the NAND gate 11. That is to say, when the control signal C is logical "0", the oscillator 5 oscillates, so that a clock pulse $\phi$ with frequency determined by a time constant C.R is outputted from the NAND gate 11. On the other hand, when a signal of logical "0" is applied to the second terminal of the NAND gate 11, that is, when the control signal C is logical "1", the oscillator 5 stops its own operation so as not to produce the clock pulse $\phi$. The clock pulse $\phi$ is inputted to the frequency divider 6 to be frequency-divided thus forming fundamental clock pulses $\phi 1$ and $\phi 2$ of a given frequency. These clock pulses $\phi 1$ and $\phi 2$ are applied into a timing signal generator 19 in the CPU 2.

The CPU 2 includes an ROM (read only memory) 15 storing micro instructions to execute various operations of the calculator, an ROM address section 16 sequentially specifying the addresses of the micro instructions stored in the ROM 15, an RAM (random access memory) 17 for storing the data of the operation result of the entered data, an arithmetic and logic unit (ALU) 18 for executing given operations, and a timing signal generator 19 responsive to the clock pulses $\phi 1$ and $\phi 2$ to produce various timing signals. When addressed by the ROM address section 16, the ROM 15 produces a micro instruction from the address specified. This micro instruction includes address data AD for specifying row and column addresses in a group of registers forming the RAM 17 and various control signals to control the arithmetic and logic unit 18 and the timing signal generator 19. The RAM 17, which is of a C-MOS static type, comprises a plurality of registers, for example, an X register 171 for storing a second operand (in this embodiment, the X register also serves as a display register), an X register for storing a first operand, an A register 173 used as a counter, a B register 174 and the like. The A register 173, to be more specific, is used as a counter to count time after none of the keys of the key input section 3 is operated. The operation of the time count is executed by the arithmetic and logic unit 18. When the contents of the register 173 becomes 10 minutes, the ROM address section 16 provides the control signal C.

The B register 174 is used as another counter to count and store the column address at the time of the key sampling operation in the key input section 3 and the display digit of the display section 4. As will be described later, the key sampling operation and the display operation are executed simultaneously. The operation to update the contents of the counter is executed by the arithmetic and logic unit 18. In a normal operation mode, the arithmetic and logic unit 18 operates the data sequentially read out from the RAM 17 and loads the result of the operation into the register specified in the RAM 17. In a time count operation, the operation circuit 18 performs the given number of additions of the contents of the A register 173 in the RAM 17 which are periodically read out. The addition operations are each such as a "+1" operation. The result of the operation is transferred into the A register 173 and is stored therein. The operation circuit 18 performs periodically the key sampling operation as mentioned above and the operation to update the contents of the B register 174 in the display operation mode. Also in this operation mode, the contents of the B register 174 is read out into the operation circuit 18 where the "+1" operation is performed. The result of the operation is transferred to the key input section 3 and the display section 4, and at the same time to the B register 174 to be stored therein.

The key input section 3 has a plurality of keys arranged in matrix fashion. In the key sampling operation, when the column addresses are successively specified by the contents of the B register 174, an ON/OFF state of each key switch of each column are detected. The ON/OFF state is once loaded into a given register in the RAM 17 and then is transferred to the operation circuit 18 where it is processed properly. At this time, if there is a key switch with an ON state, the data representing the key switch is applied to the X register 171 for display in the RAM 17.

The display section 4 has a plurality of display elements located at the corresponding digits. The digits of the display section 4 are sequentially specified by the contents of the B register 174. At the same time, the contents of the X register 171 corresponding to the digits are applied through the operation circuit 18 to the display section 4 where the contents of the corresponding digits are displayed.

Figure 4:
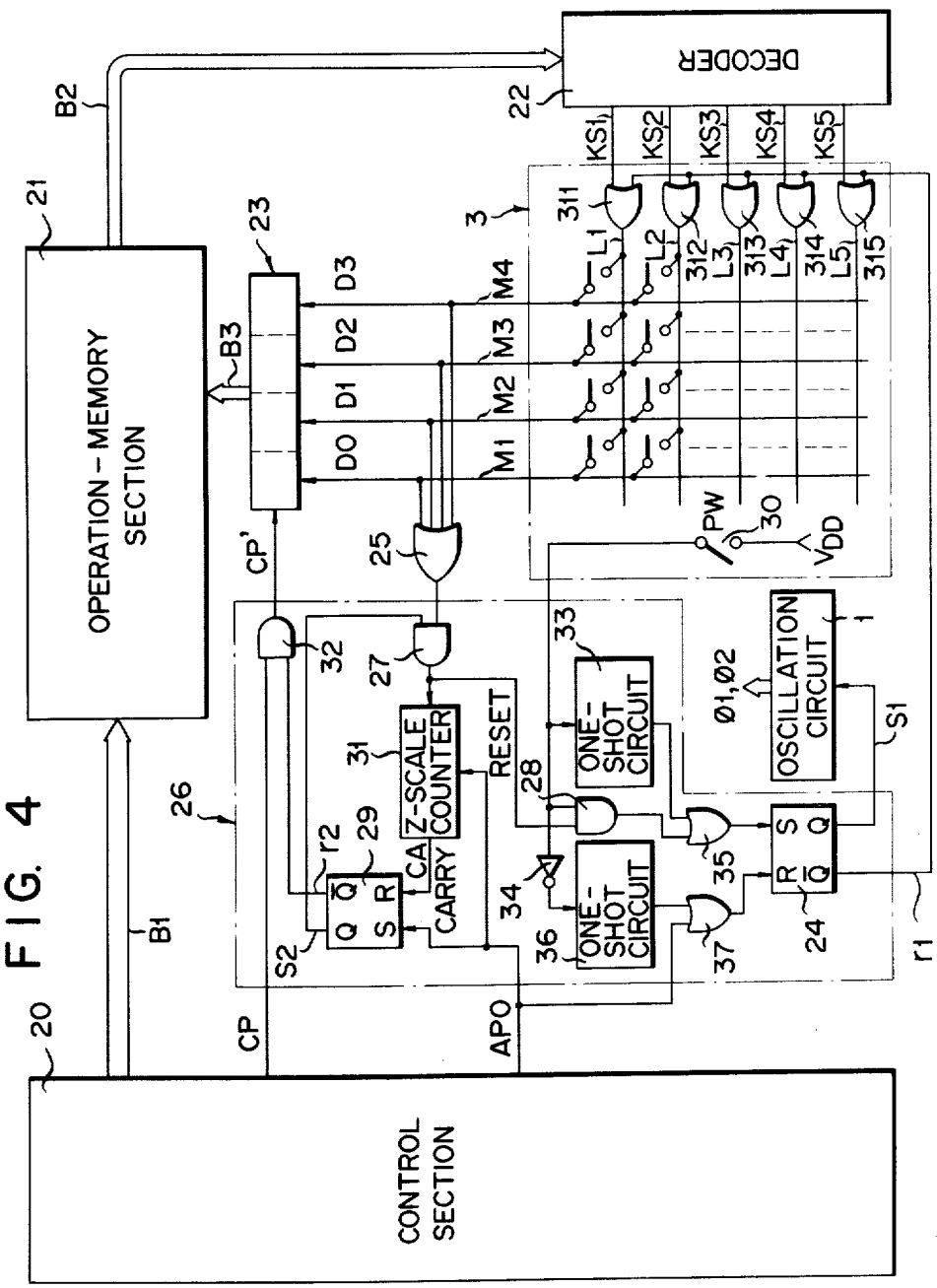
FIG. 4 shows a block circuit diagram of an overall construction of another embodiment of this invention.

The central processing unit 2 and the display section 4 are supplied with a power source voltage $+V_{DD}$, as shown in FIG. 4. While the power source switch (not shown) is turned on, when the control signal C is produced, the oscillating circuit 1 stops its operation to produce no clock pulse $\phi$, so that the clock pulses $\phi 1$ and $\phi 2$ are not produced. In such a situation, the CPU 2 stops its operation, so that the CPU 2 and the display section 4 consume little power. This state is substantially equivalent to a state that the power source switch is turned off. Further, in this embodiment of the invention, the operation result or the like having been stored in the RAM 17 are backed up by the power source voltage $+V_{DD}$, so that the data is held.

Figure 3A:
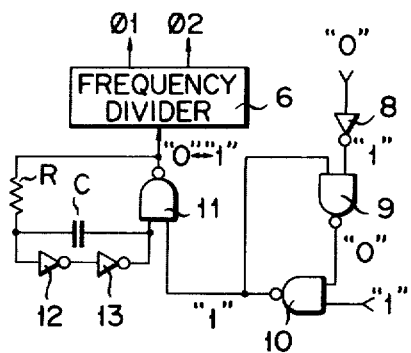
FIGS. 3(a) to 3(d) illustrate levels at the respective portions in the oscillating circuit in the various operation modes of the calculator.
Figure 3B:
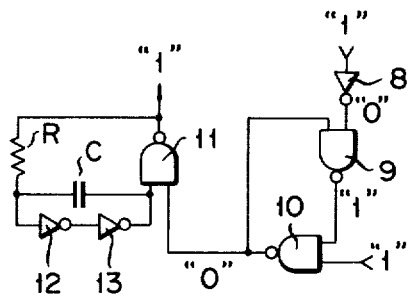
Figure 3C:
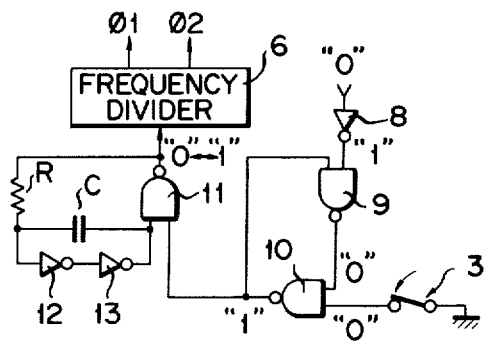

The operation of the above-mentioned embodiment will be described with reference to FIGS. 2 and 3. FIGS. 2(a) to 2(d) show the display contents of the display section 4 and the contents of the X register 171 in four operation modes. FIGS. 3(a) to 3(d) show the logical levels at the respective portions in the oscillating circuit 1 in the operation modes, corresponding to the contents of FIGS. 2(a) to 2(d). Numeral keys [1], [2] and [3] of the key input section 3 are operated to enter numeral data "123". At the time point that the numeral key [1] is operated, the control signal is not yet outputted, and therefore the output of the inverter 8 is logical "1". Further, the output of the NAND gate 10 is logical "1", so that the output signal of the NAND gate 11 produces the clock pulse $\phi$ which alternately changes its level "1" and "0" at the periods each defined by the time constant C.R and is applied to the frequency divider 6. The frequency divider 6 forms the fundamental clock pulses $\phi 1$ and $\phi 2$ on the base of the clock pulse $\phi$ which are in turn applied to the timing signal generator circuit 19 in the CPU 2 thereby to produce a given timing signal. The CPU 2 executes the key sampling operation at given periods as in the above-mentioned manner to detect the ON/OFF state of the key switch in the key input section 3. As a result, when the numeral keys [1], [2] and [3] are sequentially depressed, the numeral data "1", "2" and "3" are inputted into the X register 171 in the RAM 17. The contents of the X register 171 is transferred to the display section 4 where it is displayed. FIG. 2(a) shows the display of the contents of the X register 171 when the operation of the numeral key [3] is completed. The least significant digit P of the X register 171 represents the place of the decimal point. FIG. 3(a) shows the level at the respective portions of the oscillating circuit 1 at this time. After the numeral key [3] is operated, if the key operation ceases for 10 minutes or more, for example, in the course of the operation, the key sampling operation is performed during this period to judge that the key is not operated. Also during this period, the operation to make "+1" of the contents of the A register 173 as serving as the counter for time count in the RAM 17 is repeated. When it is judged that the contents of the A register 173 amounts to the contents corresponding to the 10 minutes, the ROM address section 16 produces the control signal C as a logical "1" signal. For this, the output of the inverter 8 becomes logical "0", as shown in FIG. 3(b), so that the output signals of the NAND gates 9 and 10 are inverted to be "1" and "0" and the inverted states are held. Accordingly, the output signal of the NAND gate 11 continues the logical "1" state and the frequency divider 6 stops the production of the clock pulses $\phi 1$ and $\phi 2$. As a result, all the operations of the CPU 2 stop. At this time, as shown in FIG. 2(b), the contents of the X register 171 is kept without being cleared and further the display section 4 is in a blank state since it is not supplied with the drive pulse signal. In this way, when a key operation is not carried out for 10 minutes or more, the operation of the oscillator circuit 1 is stopped after the outputting of the control signal C to stop the production of the clock pulses $\phi 1$ and $\phi 2$. This state of the circuit is equivalent to the power stoppage state. Therefore, the power consumption during this period is almost zero but the result of the operation is kept as it is to be ready for the restart of the operation.

Figure 3D:
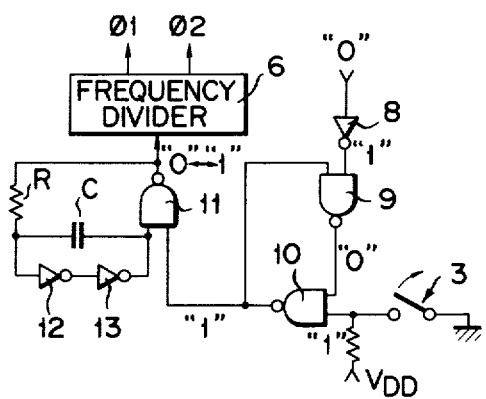

To restart the operation, a key switch of the key input section 3 is then operated. Upon the operation of the key switch, the output of the key switch (logical "0" signal) is inputted to the NAND gate 10 to invert the output signal for the NAND gate 11 to be logical "1". Accordingly, the NAND gate 11 starts to produce the clock pulse $\phi$ and thus to produce the clock pulses $\phi 1$ and $\phi 2$, so that the key sampling operation of the CPU 2 begins again. In this case, the control signal C is not produced to have a logical "0" state. As shown in FIG. 2(c), the display operation of the display section 4 also restarts to display the numeral data "123." previously inputted. FIG. 3(d) shows a state of the oscillation circuit 1 when the operation of the key switch is completed, and indicates that the state is returned to the state shown in FIG. 3(a).

In the above-mentioned embodiment, the oscillation circuit is comprised of an RC oscillator, the frequency divider, and the input gate. The circuit may be variously modified, however, if the circuit modified is such that, when the key is not operated for a given time while the power source is turned on, the oscillation stops but is restarts when the key is operated at the operation restart. Now referring to FIG. 4, another embodiment of the invention will be described, in which any key which is depressed first after the circuit has been set to the automatic power off mode will release the automatic power off mode and the key which is depressed next makes the data entering possible. In FIG. 4 like numerals are used to denote like elements shown in FIG. 1 and a few blocks indicate combinations of some blocks shown in FIG. 1, for simplicity of explanation.

In FIG. 4, reference numeral 20 designates a control section including the ROM 15, the ROM address section 16 and the timing signal generating circuit 19 shown in FIG. 1. The circuit construction is similar to that shown in FIG. 1 and therefore the explanation of it will be omitted. The control section 20 is connected to an operation/memory section 21 including the RAM 17 and the arithmetic and logic unit 18, through a bus line B1. The key sampling data produced from the operation/memory section 21 is applied to the decoder 22, through a bus line B2. The decoder 22 decodes the key sampling data received to sequentially produce key sampling signals KS1 to KS5, which in turn are applied through OR gates 311 to 315 to input lines L1 to L5. Key switches corresponding to numeral keys corresponding to the numerals 0 to 9, and function keys to direct the operations respectively are arranged at the crosspoints of the input lines L1 to L5 of the key input section 3 and the output lines M1 to M4. Accordingly, when the key sampling signals KS1 to KS5 are sequentially inputted into the input lines L1 to L5, the ON/OFF state of the four keys on the respective input lines are outputted in parallel as the key data D0 to D3 of 4 bits which are in turn transferred to a key buffer register 23 in the CPU 2. When the calculator is in the automatic power off mode, a reset output signal r1 of an RS flip-flop 24 which is reset when the calculator is in the automatic power off state is applied through OR gates 311 to 315 to the input lines L1 to L5, in order that the automatic power off mode may be released by operating any of the keys in the key input section 3. The key data D0 to D3 are all inputted to the first input terminals of AND gates 27 and 28 in the power source control circuit 26, through an OR gate 25. To the second input terminal of the AND gate 27 is inputted a set output signal S2 of an RS type flip-flop 29. The RS type flip-flop 29 takes a set state when the calculator is in the automatic power off mode. For this, an automatic power off signal APO (substantially identical with the control signal C in FIG. 1) is inputted to the set input terminal S of the flip-flop 29. The signal APO is produced when the key of the key input section 3 remains unoperated for a given time period, for example, 10 minutes while the power source switch 30 is left ON. For this, the arithmetic and logic circuit 18 in the operation/memory section 21 is so designed that the operation for the time count (for example, +1 operation) is performed every key operation under control of the control section 20. At the time of operation, the A register 173 (see FIG. 1) of the RAM in the operation/memory 21 is used for storing the count data.

The output signal from the AND gate 27 is inputted to a binary counter 31 where it is counted. The signal APO is inputted to the reset terminal of the binary counter 31. When the APO signal is produced, the binary counter 31 is reset to "0". When the contents of the binary counter 31 is counted up and its contents are changed from "1" to "0", a carry signal CA produced from the binary counter 31 is inputted to the reset input terminal R of the flip-flop 29. The reset output signal r2 of the flip-flop 29 which is placed in the reset state is applied to the first input terminal of an AND gate 32. To the second input terminal of the AND gate 32 is supplied a clock pulse CP from the control section 20. When both the signal r2 and the clock pulse CP are supplied to the AND gate 32, a clock pulse CP' in synchronism with the clock pulse CP is applied as a data write control signal from the AND gate 32 to the key buffer register 23, whereby the key data D0 to D3 are loaded into the key buffer register 23.

The power source voltage $V_{DD}$ is inputted into the input terminal of the power source switch 30 of which the output signal is supplied to one-shot circuit 33, an AND gate 28 and an inverter 34. The output signal from the one-shot circuit 33 is applied through an OR gate 35 to the set input terminal S of an RS type flip-flop 24.

To the AND gate 28 is inputted an outut signal of the OR gate 25 which is produced when a key is operated. The output signal of the AND gate 28 is also applied to the set input terminal S of the flip-flop 24, through an OR gate 35. The output signal from the inverter 34 is inputted to an one-shot circuit 36 of which the output signal is inputted to the reset input terminal R of the flip-flop 24, through an OR gate 37. The signal APO is also applied through the OR gate 37 to the reset input terminal R of the flip-flop 24 thereby to reset the flip-flop 24. The set output signal S1 of the flip-flop 24 is applied as a control signal (see FIG. 1) to one input terminal of the NAND gate 11 in the oscillator 1, in place of the output signal from the NAND gate 10. When the set output signal S1 is logical "1", the oscillator 1 produces a clock pulse $\phi$ with a given frequency for driving the respective circuits, which in turn is applied to the frequency divider 6 where the clock pulses $\phi 1$ and $\phi 2$ are produced. The clock pulses $\phi 1$ and $\phi 2$ are inputted to a timing signal generating circuit 19 included in the control section 20. When the flip-flop 24 is reset by turning off the power source switch 30 or producing the automatic power off signal APO, the oscillator circuit 1 stops its operation to produce no clock pulse $\phi$, so that the circuit is in stop state. When the automatic power off mode is released by turning on the power source switch 30 or operating any one of the keys of the key input section 3, the flip-flop 24 is set to drive the oscillator circuit 1 to supply the clock pulse $\phi$ to the respective circuits.

The operation of the above-mentioned embodiment of the invention will be described with reference to FIGS. 5(a) to 5(g). To use the electronic calculator, when the power source switch 30 is turned on, the one-shot circuit 33 produces a one-shot pulse signal which in turn is applied through the OR gate 35 to the set input terminal S of the flip-flop circuit 24. As a result, the flip-flop 24 is set to produce a set output signal S1 of logical "1" which in turn is applied to the oscillator circuit 1. Upon receipt of the signal S1, the oscillator circuit 1 starts to operate to produce the clock signals $\phi 1$ and $\phi 2$ which cause the timing signal generating circuit 19 in the control section 20 to produce various timing signals for transmission to the respective circuits. By those timing signals, the respective circuits start their operations. The operation/memory circuit 21 transfers the key sampling data to the decoder 22 under control of the control section 20 to start the key sampling operation. The decoder 22 sequentially produces the key sampling signals KS1 to KS5 to be applied to the input lines L1 to L5 of the key input section 3, so that the key input section 3 produces the key data D0 to D3 through the output terminals M1 to M4. Since the flip-flop 29 is reset at this time, the reset signal r2 is logical "1" (FIG. 5(c)) and thereby the AND gate 32 is fully conditioned (FIG. 5(g)). Further, the control section 20 produces the key data write clock pulse CP (FIG. 5(f)), corresponding to the key sampling operation, which is applied to the AND gate 32. The AND gate 32 produces the clock pulse CP' (FIG. 5(g)), so that the key data D0 to D3 are loaded into the key buffer register 23. Then, the key data D0 to D3 are applied to the operation/memory section 21 where the operation to detect the contents of the key data D0 to D3, that is to say, the operation to check if the operated key is present or not, is performed. The key sampling operation is repetitively executed until any one of the keys is operated. When any key is operated, the operation of the key is detected from the contents of the key data D0 to D3 and then the operation/memory section 21 performs a processing of the key data D0 to D3 such as entering data or operation initiating an. After the operation terminates, the key sampling operation restarts and subsequently a similar operation is repeated.

When the key operation is not performed after the entering operation by the key operation or the operation process while the power source switch 30 is left ON, the operation/memory section 21 executes the time count operation together with the key sampling operation mentioned above, as in the manner similar to that referred to in FIG. 1, until a given time lapses after the final key operation. Upon lapse of the given time, the control section 20 produces the automatic power off signal APO which is transferred to the set input terminal S of the flip-flop 29. Accordingly, the flip-flop 29 is set to produce a set output signal S2 of logical "1" (FIG. 5(a)) which is then applied to open the AND gate 27. Since the flip-flop 29 is set at this time, the reset output signal r2 is logical "0", so that the AND gate 27 is enabled. The automatic power off signal APO is applied to the reset terminal of the binary counter 31 to clear the contents of the binary counter 31 to render the contents of the counter 31 zero. The automatic power off signal APO is also applied to the reset input terminal R of the flip-flop 24 through the OR gate 37 thereby to reset the flip-flop 24 of which the reset output signal r1 is inverted to be "1" and the set output signal S1 is inverted to be "0". The set output signal S1 is applied to one of the input terminals of the NAND gate 11 (FIG. 2) to stop the oscillator circuit 1 and the production of the clock pulses $\phi 1$ and $\phi 2$. As a result, the operation of the respective circuits in the calculator stops and the power consumption becomes almost zero, so that the automatic power off mode is established. The reset output signal r1 ("1" signal) of the flip-flop 24 is constantly applied to the input lines L1 to L5 of the key input section 3, through the OR gates 311 to 315, during the period of the automatic power off mode.

The explanation to follow is for the operation in which the automatic power off mode of the calculator is released and the use of the calculator starts. Firstly, a one of the keys in the key input section 3, for example, the numeral key 1 (FIG. 5(a)) is operated. At this time, the reset output signal r1 of logical "1" has been applied to the input lines L1 to L5, so that the key data D0 to D3 including the data of the turning on of the numeral key 1 (only the bit of the key data D0 to D3 corresponding to the numeral key 1 is logical "1") is produced through the output lines M1 to M4. The OR gate 25 produces a signal of logical "1" for a given time period and the logical "1" signal is transferred to the AND gates 27 and 28. Upon receipt of the logical "1" signal the AND gate 27 opens and produces an output signal in synchronism with the output signal from the OR gate 25 and the output signal is applied to the binary counter 31. As a result, the contents of the binary counter 31 are counted up to be "1". Since the power source switch 30 is left ON, the output signal of the switch 30 is logical "1" to enable the AND gate 28. Accordingly, the output signal of logical "1" produced from the OR gate 25 is produced from the AND gate 28, which is applied through the OR gate 35 to the set input terminal S of the flip-flop 24. Therefore, the flip-flop 24 is set, and the set output signal S1 is inverted to be "1" and the reset output signal r1 is inverted to be logical "0". Accordingly, the oscillator circuit 1 starts its operation to produce the clock pulses $\phi 1$ and $\phi 2$, so that the respective circuits in the calculator start. In this way, the automatic power off mode is released.

The operation to restart the operation, that is, how the input data is entered into the calculator, will be described. Following the key [1], the numeral key [2] (FIG. 5(a)) necessary for the operation is turned on. As a result, the key data D0 to D3 including the ON data of the numeral key [2] is produced from the key input section 3 and is transferred to the key buffer register 23 and the OR gate 25. The OR gate 25 produces a signal of logical "1" for a given time (FIG. 5(b)) which is applied to the AND gates 27 and 28. At this time, the AND gate 27 is not yet enabled, so that the AND gate 27 produces a signal of "1" which in turn is applied to the binary counter 31. Therefore, the contents of the binary counter 31 is incremented by one (+1) to be changed from "1" to "0", so that the binary counter 31 produces the carry signal CA (FIG. 5(c)) which in turn is applied to the reset input terminal R of the flip-flop 29. Accordingly, the flip-flop 29 is reset to invert the reset output signal S2 to be logical "0", and to invert the reset output signal r2 to be logical "1". The reset output signal r2 is transferred to enable the AND gate 32. At this time, the control section 20 applies the clock pulse CP for key data write to the AND gate 32. Accordingly, the AND gate 32 produces a clock pulse CP' (FIG. 5(g)) in synchronism with the clock pulse CP and the clock pulse CP' is transferred to the key buffer register 23. Responsive to the clock pulse CP', the key buffer register 23 allows the key data D0 to D3 to be loaded thereinto. The key data loaded is transferred from the key buffer register 23 to the operation/memory section 21 where a given process is performed.

In this way, the automatic power off mode having been set in the calculator by the first operation of a key of the key input section 3, is released so that the calculator becomes in the ON mode to be ready for the subsequent data entering or data processing.

As described above, in the construction of the FIG. 4 embodiment, even after the calculator is set to the automatic power off mode, the operation of any one of the keys of the input section 3 enables the automatic power off mode to be released. Unlike in the conventional calculator, a key exclusively for releasing the automatic power off mode is not used. The number of keys is therefore reduced, and the calculator can be made small and inexpensive. In addition to the releasing of the automatic power off mode, the key operation is restricted by nothing when the key is operated for its mode releasing, since the circuit is designed so that the data processing corresponding to the key operated is not yet executed at the time of the key operation. Therefore, the onerous key operation by a specific key to release the automatic power off mode, which is essential to the conventional calculator, is eliminated. Accordingly, the restoring operation to the ON state is easily performed to allow the operation mode to smoothly shift to the subsequent data entering or the data processing.

Figure 5:
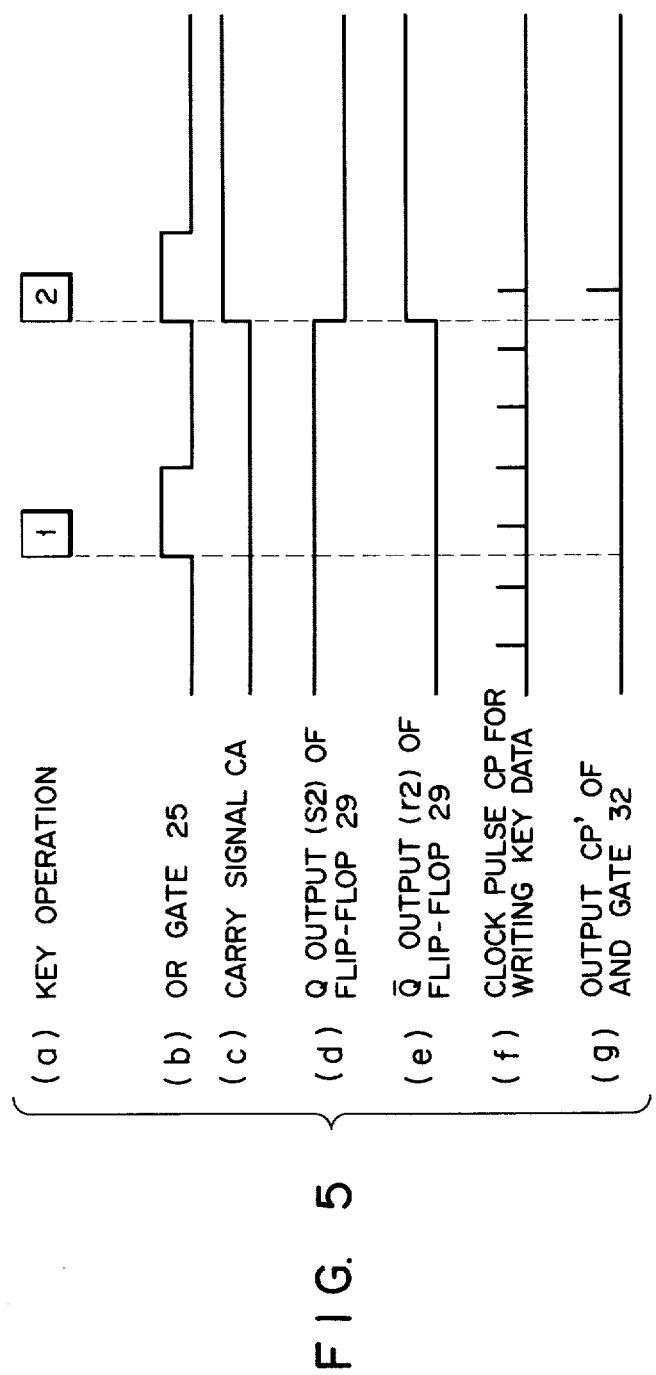
FIGS. 5(a) to 5(g) show a set of timing diagrams useful in explaining the operation of the calculator when a key is operated after the automatic power off mode is set up in the calculator.

In the above-mentioned embodiment, the key operation in FIGS. 4 and 5 was described by using the numeral key [1]; however, a function key may be used in place of the numeral key. Also when the function key is operated, the first operation never starts the operation.

The binary counter to count the number of the operations of keys after the automatic power off mode is set up, is provided separately from the arithmetic/memory section 2 in the above mentioned embodiment. This may be effected in a manner similar to that to count the time to set up the automatic power off within the operation/memory section 21. In this case, a count area is provided in the RAM.

Another embodiment of the power consumption control system of the invention which is capable of releasing the automatic power off mode, will be described with reference to FIGS. 6 to 9.

Like reference symbols are used to designate like or equivalent portions in FIG. 4.

A major feature of this embodiment resides in that the automatic power off state may be released by any one of the keys in the key input section and that it is judged whether or not any key is operated, according to the time the key depression lasts. If the key is depressed for more about one second, the data input operation is carried out.

Figure 6:
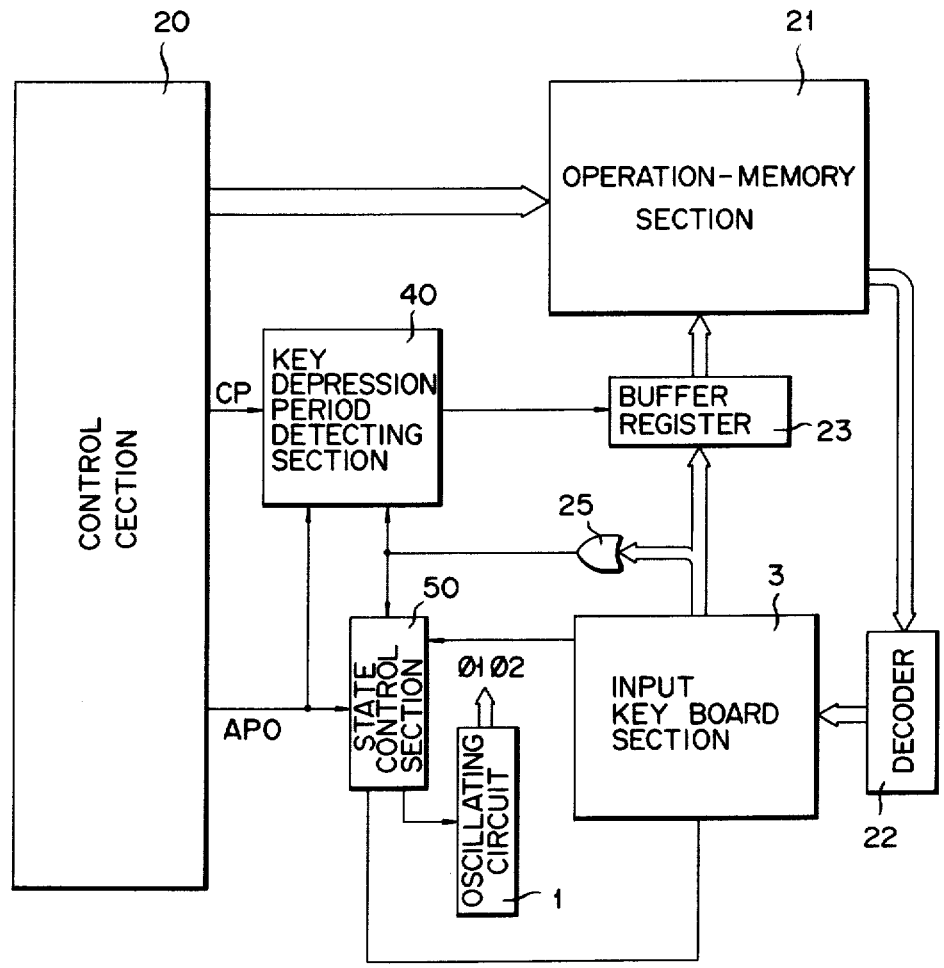
FIG. 6 shows a block diagram of an overall system of another embodiment when the system of the invention is applied to an electronic calculator.

FIG. 6 shows a block diagram of an overall calculator as the embodiment of the invention, with a key depression period detecting section 40 which monitors the time period that the key depression lasts and automatically selects the operation restoration of the calculator after the automatic power off on the basis of the result of the monitoring. The key depression period monitor or detecting section 40 is illustrated in detail in FIG. 7. When any one of the keys in the key input section 3 is depressed, the output signal from the OR gate 25 (FIG. 4) is applied to an AND gate 41 (corresponding to the AND gate 27 in FIG. 4) in the section 40 when it is depressed. The output signal from the AND gate 41 is applied to a binary counter 42 (corresponding to the binary counter 31 in FIG. 4) and to an AND gate 43 with a clock pulse for time count at the other input termnal. The binary counter 42 counts the output signal from the AND gate 41 and a one-second counter 44 counts the depression time of the key applied through AND gates 41 and 43. Carry signals from the binary counter 42 and the one-second counter 44 is applied to the reset terminal R of an R-S flip-flop (referred to as an FF), through an OR gate 45 (corresponding to the flip-flop 29 in FIG. 4). The FF 46 is reset when a carry signal is produced from either the binary counter 42 or the one-second counter 44. The set output signal $\overline{Q}$ of the FF 23 is applied as a switch control signal to an AND gate 47 (corresponding to the AND gate 32 in FIG. 4) which receives at the other input terminal the CP signal from the control section 20. The output of the AND gate 47 is applied as a write signal to the key buffer register 23. When the automatic power off mode is set up, the APO signal produced from the control section 20 is applied to the reset input terminal R of the binary counter 42 and the one-second counter 44 and the set input terminal S of FF 46. The set output of FF 46 is applied to the AND gate 41. A state control section 50 in FIG. 6 is exactly the same as the arrangement having the one-shot circuits 33 and 36, the R-S type flip-flop 24, the OR gates 35 and 37, the AND gate 28 and the inverter 34. The explanation of the section 50 will be omitted.

The operation of the calculator constructed as shown in FIGS. 6 and 7 will be described.

The operation of the calculator until the automatic power off mode is set up is similar to that of the calculator shown in FIG. 4. Therefore, the explanation will proceed with the releasing operation of the automatic power off mode, referring to FIGS. 8(a) to 8(j) and FIGS. 9(a) to 9(j). A case where the key depression time is below one second after the automatic power off follows. When the automatic power off takes place, the FF 17 shown in FIG. 7 is reset, as stated previously, and the operation of the oscillator circuit 1 stops, so that all the keys in the key input section 3 are ready for key-in operation. Further, since the FF 46 has been set, the AND gate 41 is conditioned for its enabling and the AND gate 47 is conditioned for its disabling.

When the numeral key, for example, the key [1] (FIG. 8(a)) is depressed, the output signal from the depressed key is applied to the state control section 50, through the OR gate 25. The flip-flop 24 is set through the AND gate 28 and the OR gate 35, so that the oscillation circuit 1 is driven and the clock pulses $\phi 1$ and $\phi 2$ are produced again. The key operation signal from the OR gate 25 is applied to the AND gate 41 of the depression time monitoring circuit 40. At this time, the FF 46 is in set state and its set output is logical "1", so that the AND gate 41 produces the key operation signal to increment the count of the binary counter 42 by one and at the same time to enable the AND gate 43. The AND gate 43 being enabled permits the clock pulse derived from the oscillator circuit 1 to pass therethrough to the one-second counter 44 to drive it. The one-second counter 44 detects or monitors the depression lasting time of the key. When the depressed key is released within one second, the carry signals D and C from the one-second counter 44 and the binary counter 42 are not produced (FIGS. 8(b) and 8 (g)). Accordingly, the FF 46 is not reset and the reset output $\overline{Q}$ is "0". Therefore, even when receiving the CP signal from the control section 20, the signal CP is not produced from the AND gate 47. Accordingly, the key data is not loaded into the key buffer, but only the release of the automatic power off mode is performed. As a result, the calculator restores a power-on mode to be ready for the subsequent operation. After that, as shown in FIG. 8(a), when an entry key, for example a key [2], is depressed for the second time, this key operation signal is applied to the binary counter 42 through the OR gate 25 and the AND gate 41 being conditioned for the enabling. The binary counter 42 is then counted up to produce a carry signal C. The carry signal is applied to the OR gate 45 to reset the FF 46. The key operation signal is loaded in the key buffer register 23 in order that the CP' signal is outputted through the AND gate 47. The contents of the buffer register 23 is transferred to the operation/memory 21 where a given processing (in this case, entering processing) is performed. The operation of the calculator when the depressed key is released after one second of the key depression lasting time will be described with reference to FIG. 9. When a key is first depressed, the FF 24 of the mode control section 50 shown in FIG. 9(c) is set as mentioned above to release the automatic power off mode. The pulse oscillator 1 starts to produce a clock pulse and the calculator becomes in the power-on mode. At the same time, the output signal from the OR gate 25 enables the AND gate 41 (in the FF 46, Q="1"), and the binary counter 42 is counted up by one. Through the AND gate 43 enabled by the output signal from the AND gate 41, the clock pulse is applied to the one-second counter 44 to be counted up. In this case, since the key is kept depressed even after one second, the one-second counter 44 produces a carry signal (FIG. 9(b)) after one second. The carry signal in turn is applied through the OR gate to the FF 46 to reset the FF 46.

Accordingly, the AND gate 47 is enabled by the reset output $\overline{Q}$ ("1") (FIG. 9(f)) of the FF 46. Since the key data write signal CP' is accordingly applied to the key buffer register 23, the key operation signal is loaded therein. In this way, with only the first time key operation performed after the automatic power off mode is set up, the key data from the key input section 1 is loaded in the buffer register 23 while the calculator is caused to be in the power-on state.

Also when a function key is operated in the automatic power off mode, the calculator restores to the power-on mode when the key depression lasts for one second or less. When it is one second or more, the calculator restores to the power-on mode, and performs the operation designated by the key depressed.

As described above, the embodiment shown in FIGS. 6 and 7 can release the automatic power off mode and can also judge if the processing of the data inputted by the depressed key is performed or not depending on the depression lasting time of the depressed key. Therefore, the invention overcomes the various disadvantages of the conventional calculator: a special key is provided and operated; the ON and OFF keys are used. To effect simultaneously both the input processing and the release of the automatic power off mode, it is sufficient to depress a key for a given time or more. To effect only the release of the automatic power off mode, the key is depressed for a time shorter than the given time. For example, in case the input process is made when the key is operated for the first time after the automatic power off mode has been set up, erroneous data would not be inputted into the calculator, allowing the release of the automatic power off mode even if a key is erroneously depressed or if an operator releases the key within a given period of time. Accordingly, by properly selecting the key depression time, the calculator can be used for its object or its state of the device.

As described above, the stoppage of the oscillation of the oscillating circuit or the judgement of the acceptance or rejection of the key-in signal is controlled by the output signal from means to monitor the depression lasting time on the basis of the key operation signal entered from the key input section. Alternately, a power source control section may be provided which controllably supplies a drive voltage or a drive pulse signal to the given circuits in the electronic device. With this provision, through the key input operation after the automatic power off mode is set up, the given circuit may be driven under control of the power source control section, while at the same time the data processing or the basis of the key operation may be performed. In the above-mentioned embodiment, the depression time supervising or detecting device including the binary counter and the one-second counter is separately provided. However, this may be incorporated into, for example, an RAM or the like in the operation/memory section.

What is claimed is:

1. A power consumption system for electronic digital data processing devices comprising:
an oscillating circuit for producing a basis clock driving signal;
a key input section having a plurality of key switches;
counting means coupled to said key input section for updating and initiating a count operation every time any one of the key switches is operated; and
control means coupled to said oscillating circuit to cause said oscillating circuit to stop oscillating and to thereby stop producing said basic clock driving signal when none of said key switches is operated before said count means completes counting for a given period of time after initiation of said count operation.

2. A power consumption control system for electronic digital data processing devices having an oscillating circuit for producing a basic clock driving signal comprising:
a key input section having a plurality of key switches;
counting means coupled to said key input section for updating and initiating a count operation every time any one of the key switches is operated;
automatic power off means to automatically cause said oscillating circuit of the electronic device to stop oscillating and to thereby stop producing said basic clock driving signal when none of said key switches is operated before said counting means counts for a given period of time after initiation of said count operation, thereby putting the electronic device in a power off state;
detecting means for detecting the first operation of a key switch after the electronic device is put into the automatic power off state; and
control means coupled to said detecting means for releasing only the automatic power off state without processing the data keyed in by said first operation of a key switch in accordance with the detected signal produced from said detecting means, and for rendering the electronic device ready for a subsequent data entering or subsequent operation.

3. A power consumption control system for electronic digital data processing devices having an oscillating circuit for producing a basic clock driving signal comprising:
a key input section having a plurality of key switches which are operated by depression of respective keys;
counting means coupled to said key input section for updating and initiating a count operation every time any one of the key switches is operated;
automatic power off means to automatically cause said oscillating circuit of the electronic device to stop oscillating and to thereby stop producing said basic clock driving signal when none of said key switches is operated befofe said counting means counts for a given period of time after initiation of said count operation, thereby putting the electronic device in a power off state;
releasing means coupled to said key input section for releasing the automatic power off state responsive to the first operation of a key switch after the electronic device is put into the automatic power off state;
time count means for counting the key depression time of said key switch first operated after the electronic device is put into the automatic power off state; and
control means coupled to said time count means for effecting the input process designated by said first operated key switch when the depression time of said key first depressed is a given time or more, said control means not effecting said designated input process when said key depression time is less than a given time, and rendering the electronic device ready for subsequent data entering or operations when said key depression time is less than a given time.

4. The power consumption system of claim 1, wherein:

said electronic device is an electronic calculator, said electronic calculator comprising at least said oscillating circuit; said key input section; operation processing means including a plurality of memories for storing a plurality of data, a calculation circuit for executing various calculations and a control circuit for controlling the calculations carried out by said calculation circuit; and a display section for displaying a result of calculation; and said calculation processing means comprises a C-MOS logical circuit.

5. The power consumption system of claim 4, wherein said counting means is associated with said memories and said calculation circuit, and discloses a count after the processing of input data corresponding to the operation of a key switch is completed and then counts up to a predetermined value.

6. The power consumption circuit of claim 4 or claim 5, wherein said operation processing means includes means for sampling keys of said key input section simultaneously with the count operation of said counting means.

7. The power consumption circuit of claim 2, wherein:

said electronic device is an electronic calculator, said electronic calculator comprising at least said oscillating circuit; said key input section; operation processing means including a plurality of memories for storing a plurality of data, a calculation circuit for executing various calculations and a control circuit for controlling the calculations carried out by said calculation circuit; and a display section for displaying a result of calculation; and said calculation processing means comprises a C-MOS logical circuit.

8. The power consumption system of claim 7, wherein said counting means is associated with said memories and said calculation circuit, and discloses a count after the processing of input data corresponding to the operation of a key switch is completed and then counts up to a predetermined value.

9. The power consumption circuit of claim 7 or claim 8, wherein said operation processing means includes means for sampling keys of said key input section simultaneously with the count operation of said counting means.

* * * * *